Aug. 25, 1959
T. H. BRUMAGIN
2,901,110
VIBRATORY CONVEYORS
Filed Dec. 6, 1955
5 Sheets-Sheet 2
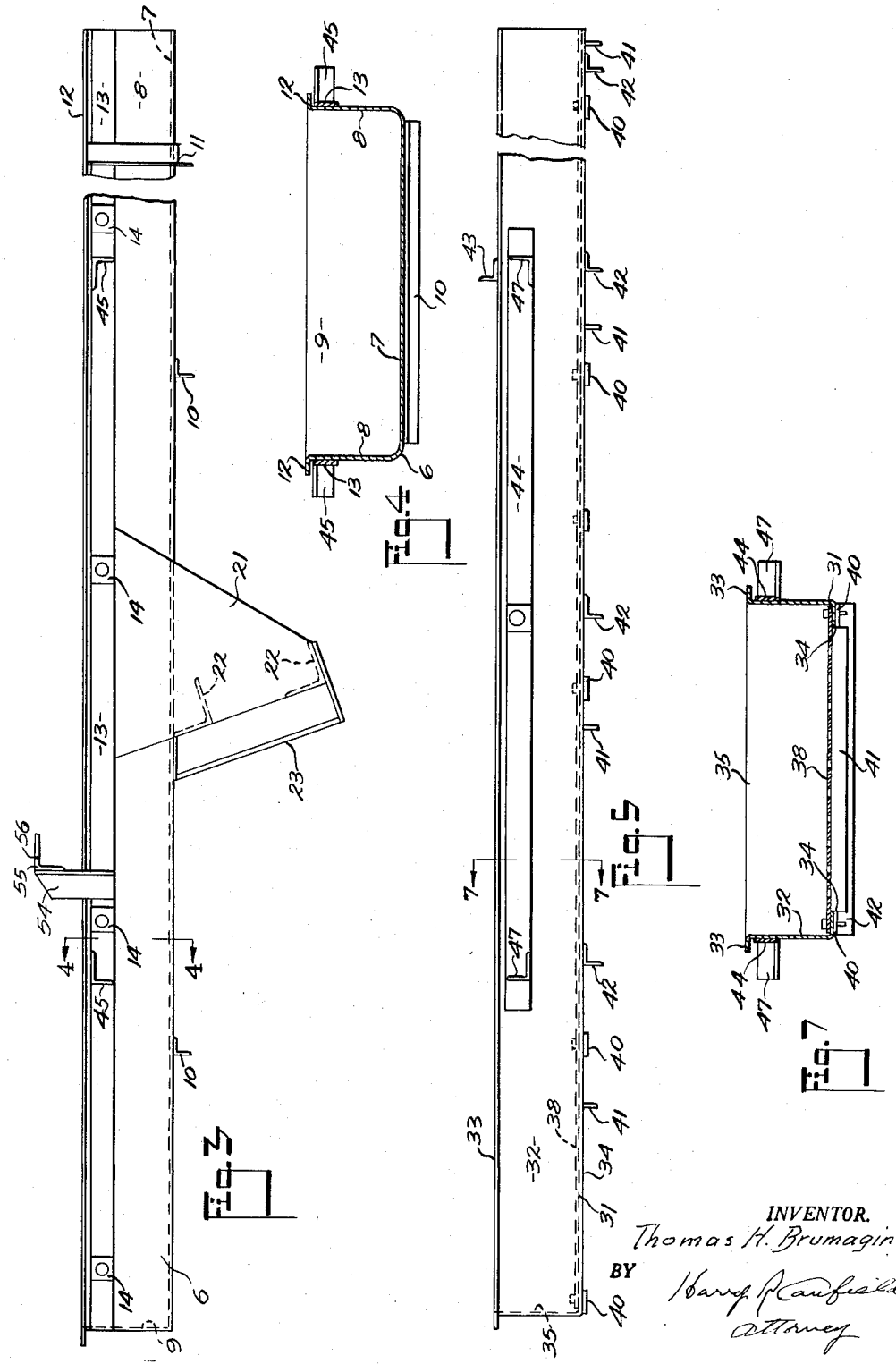
INVENTOR.
Thomas H. Brumagin
BY
Harry R Canfield
Attorney

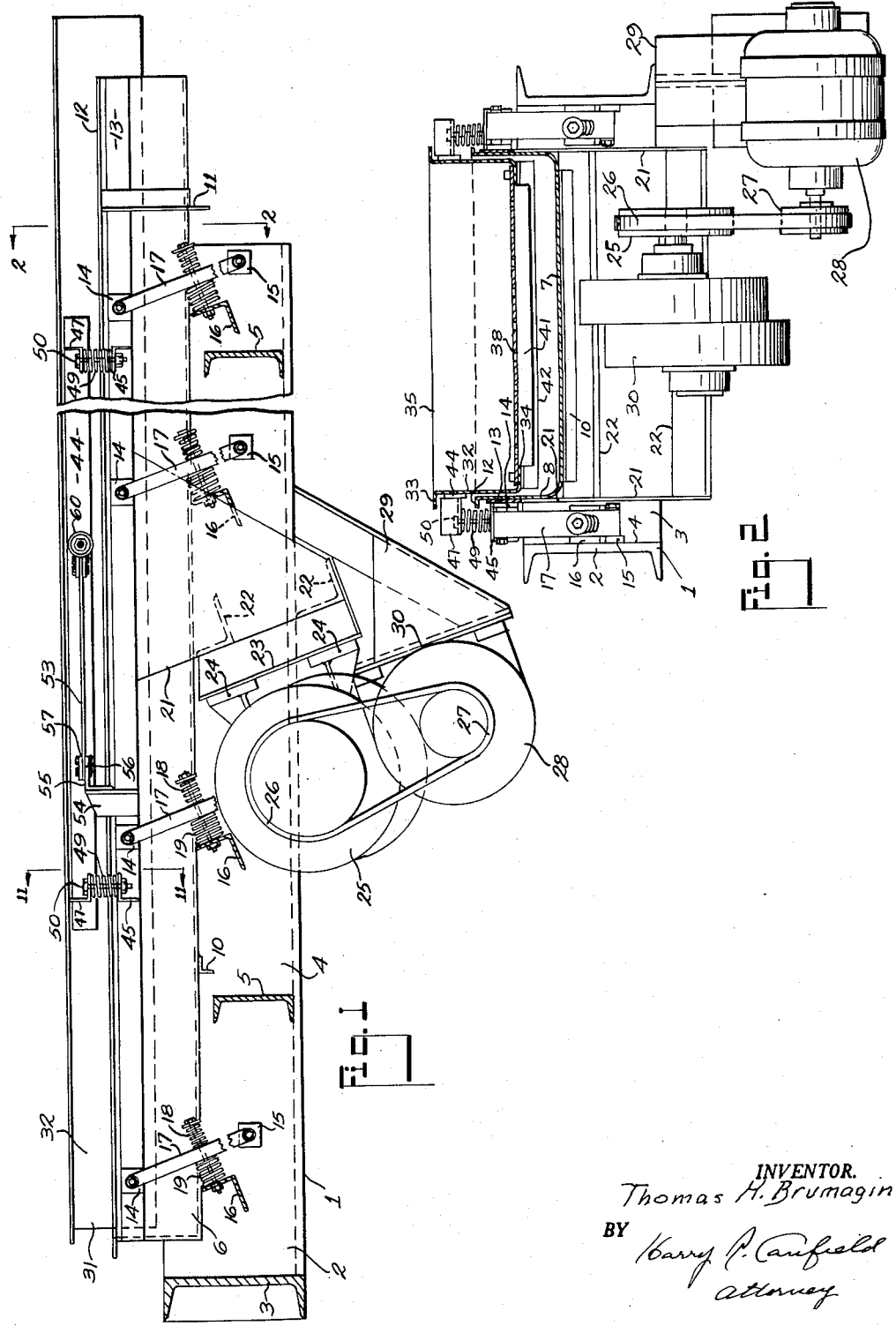

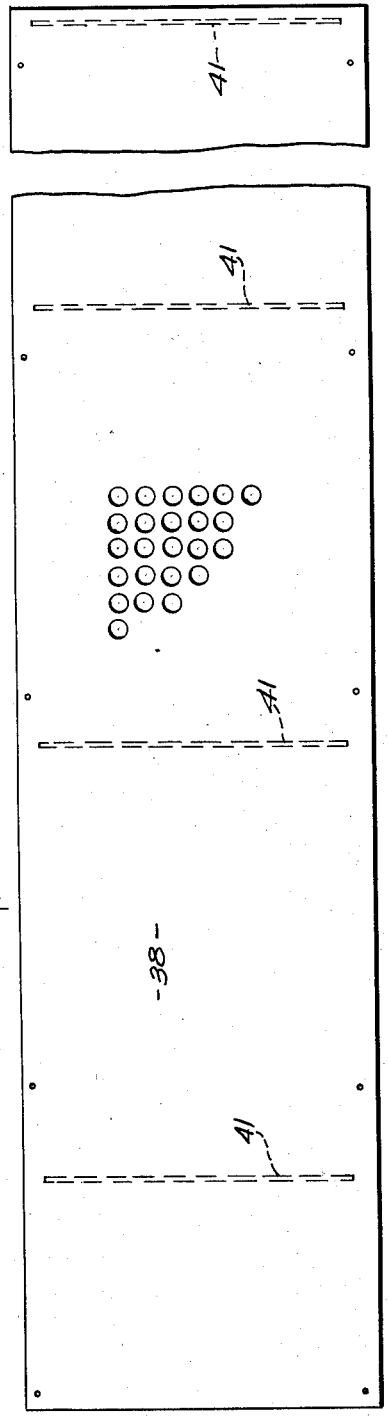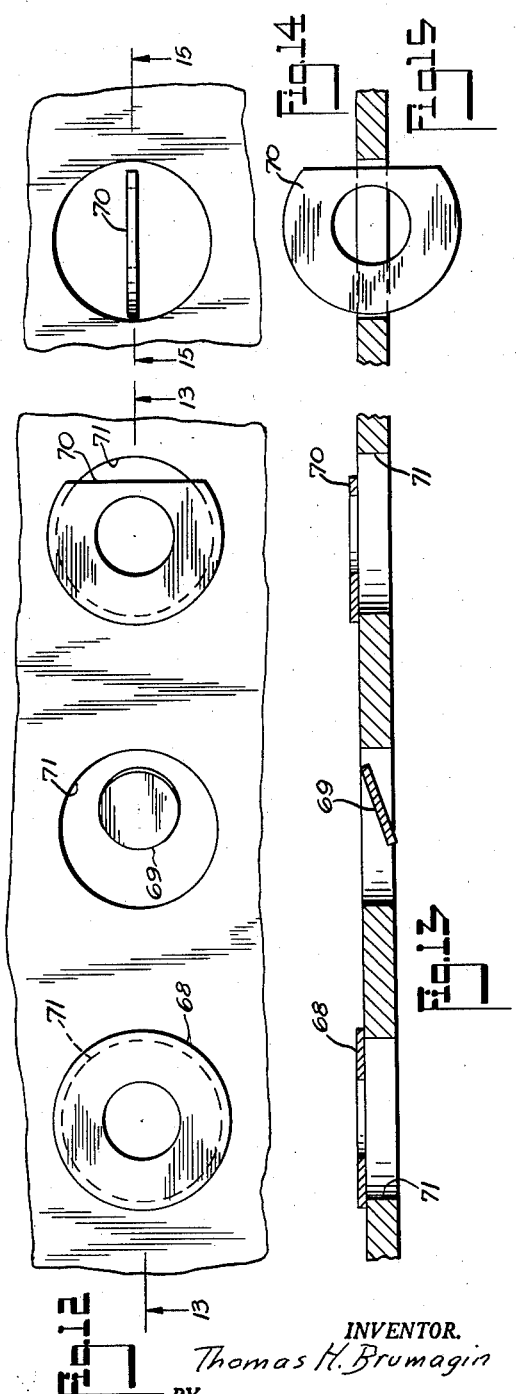

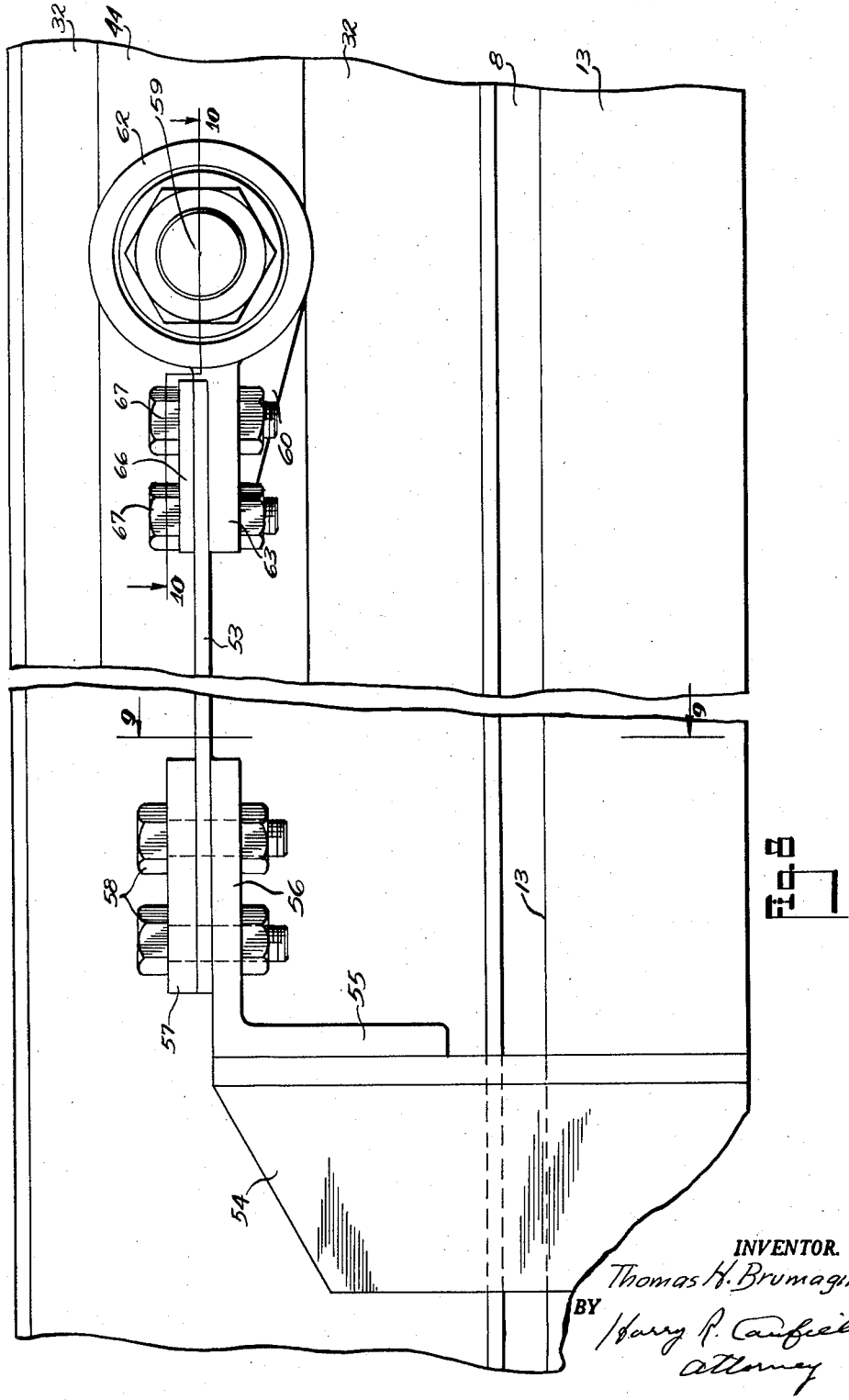

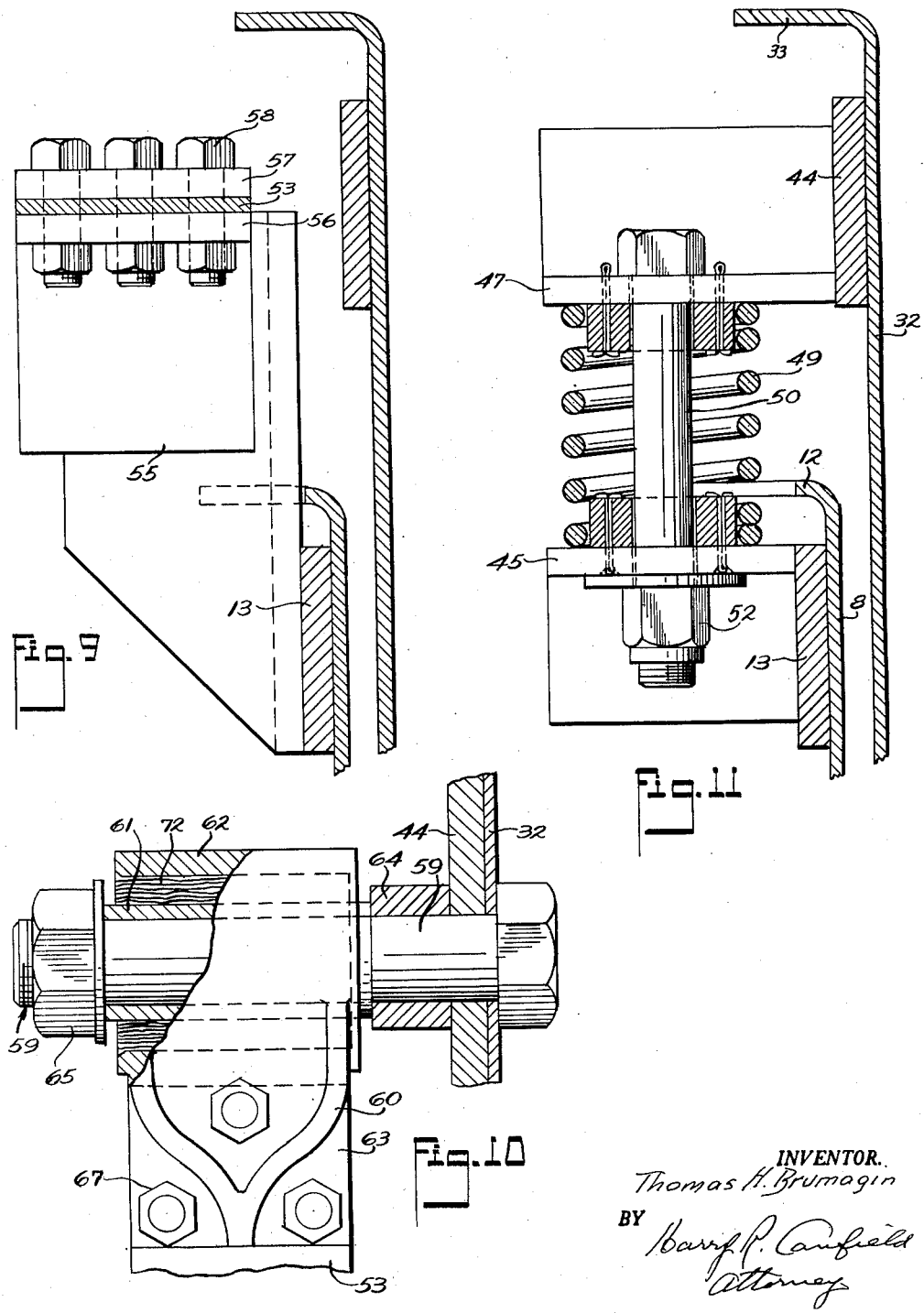

United States Patent Office 2,901,110
Patented Aug. 25, 1959

2,901,110

VIBRATORY CONVEYORS

Thomas H. Brumagin, Westfield, N.Y., assignor to Ajax Flexible Coupling Co. Inc., Westfield, N.Y., a corporation of New York Application December 6, 1955, Serial No. 551,310

9 Claims. (Cl. 209—330)

This invention relates to vibratory screening and conveying apparatus.

A general class of vibratory conveyors is known comprising an elongated trough or pan supported on a stationary frame by yieldable supports so arranged that when vibrations are communicated to the pan by power the pan has bodily vibratory movement at an inclination to the longitudinal direction; whereby discrete material fed upon one end of the pan is caused to move in a stream over the pan toward the other end and be discharged therefrom or discharged through one or more openings in the pan in the path of the stream.

In prior conveyors of this general class the pan is usually horizontal and the vibrations are produced in the horizontal direction by a rotary motor-driven mechanical vibrator and communicated horizontally to the pan. The pan however vibrates bodily at an angle to the horizontal and therefore at an angle to the direction of the vibrations communicated to it.

It is an object of the present invention to provide a vibratory conveyor of this general class having an improved construction by which vibrations are communicated to the pan in the same direction as that in which the pan vibrates.

Conveyors of this general class are also known of the multi-deck type, comprising, for example, two pans, one above the other, both vibrated by power, and both acting as vibrating conveyors. The material is fed to one end of the upper pan and conveyed over it toward the other end; and the upper pan is provided with perforations that screen the material being conveyed thereover; so that some of it is separated therefrom and falls on the lower pan and is conveyed over it.

It is among the further objects of the present invention to provide:

A conveying apparatus comprising a lower pan and an upper pan, both supported for vibratory conveying movement, and means to vibrate the lower pan with conveying movement and improved means to communicate its conveying vibratory movement to the upper pan.

Apparatus as described in the preceding paragraph and by which the conveying vibratory movement of the two pans, particularly when they are substantially horizontally disposed, comprises horizontal and vertical components of movement; and the horizontal components of movement of both pans are alike and occur in unison, and the vertical component of movement of the upper pan is of a different character from that of the lower pan and not in unison therewith.

An apparatus as described in the preceding paragraphs and in which the upper pan has screening perforations of preselected size in its bottom, and some of the pieces of the material being conveyed thereon fall through the perforations to the lower pan; and in which the character of the vertical component of movement of the upper pan, is such as to agitate the material being conveyed thereon.

With these objects in view, and others that will occur to those skilled in the art to which the invention appertains, the embodiment of the invention described hereinafter comprises: a generally horizontal lower conveyor trough or pan supported on a main frame by link-like supports hingingly connected at opposite ends to the pan and frame and inclined at an angle to the vertical whereby all points of the pan have movement in alternate diagonal directions, forwardly-upwardly and rearwardly-downwardly.

A power driven mechanical vibrator is supported on the lower pan and driven by a motor supported on the main frame and vibrates the lower pan in said diagonal directions, whereby discrete material on the pan will be propelled or conveyed forwardly thereover.

An upper pan or trough is provided with a screening floor, is supported preferably parallel to the lower pan, upon and above the lower pan by springs therebetween, preferably helical springs with vertical axes; and the upper pan is connected to the lower pan by generally horizontal longitudinally rigid, laterally rigid but vertically flexible links, connected at opposite ends to the two pans.

The diagonal vibratory movements of the lower pan are composed of vertical and horizontal components. The vertical components are communicated to the upper pan through the springs; and the horizontal components are communicated to the upper pan by the horizontal links. The conveying movement of the lower pan is therefore transmitted to the upper pan; and material fed upon it will be conveyed thereover, part of it falling through its screening floor onto the lower pan and conveyed thereover.

It is contemplated that the material fed upon the upper pan will often comprise large and small pieces; and that the smaller pieces will be of irregular shape, to be referred to later herein; and that the screening action will be provided by perforations in the pan floor large enough to let through all but the largest of the pieces. In such a case the difficulty often arises that conveying vibrations alone will not agitate the pieces enough to insure that all of the irregularly shaped smaller pieces will be oriented or aligned with the perforations so as to fall through them.

Accordingly, the invention comprises means to violently agitate the pieces on the upper pan; as follows.

The said springs while communicating the vertical upward movement from the lower pan to the upper pan, are at first compressed; and then quickly expand or recoil and give a sudden impulse of upward movement to the upper pan, which is abruptly terminated by a stop device.

The pieces are thereby momentarily thrown upwardly from the pan, and turned over; and descend in reoriented positions on the pan.

The tension of the springs is adjustable, in a manner that adjusts the degree of agitation of the pieces, so that the maximum degree of agitation may be obtained that will not interfere with the conveying movement of the pieces.

The said embodiment of the invention is fully disclosed in the following description taken in connection with the accompanying drawing in which:

Fig. 1 is a side elevational view of an apparatus embodying the invention; with parts of a main frame in section on a longitudinal plane; and with a part broken out, to shorten the figure;

Fig. 2 is in general an end elevational view of the embodiment of Fig. 1, taken from the right end thereof, but with a part in section taken from the plane 2—2 of Fig. 1;

Fig. 3 is a side elevational view of a lower pan of Fig. 1, with part broken out;

Fig. 4 is a cross sectional view from the plane 4—4 of Fig. 3;

Fig. 5 is a side elevational view of an upper pan of Fig. 1, with part broken out;

Fig. 6 is a top plan view of a detachable bottom of the pan of Fig. 5, with part broken out;

Fig. 7 is a cross sectional view from the plane 7—7 of Fig. 5;

Fig. 8 is a view to enlarged scale of a part of Fig. 1, with part broken out;

Fig. 9 is a sectional view from the plane 9—9 of Fig. 8;

Fig. 10 is a sectional view from the plane 10—10 of Fig. 8;

Fig. 11 is a fragmentary sectional view to enlarged scale from the plane 11—11 of Fig. 1;

Fig. 12 is a top plan view to enlarged scale of a fragment of the pan bottom of Fig. 6, illustrating the screening action of perforations therein;

Fig. 13 is a sectional view from the plane 13—13 of Fig. 12;

Figs. 14 and 15 are views similar to Figs. 12 and 13.

Referring to the drawing there is shown at 1 a generally rectangular main frame comprising a pair of spaced apart long side channels 2—2, and a transverse end channel 3, integrally joined to the side channels at the ends thereof. The side channels are disposed with their planar webs mutually vertical and mutually confronting, providing opposite vertical interior side walls 4—4; and transverse channels 5—5 span the lower portions of the side walls 4—4 and are integrally joined at their ends thereto. The main frame is to be stationarily supported in any well known or suitable manner for example on a floor.

At 6, generally, is an elongated lower conveyor trough or pan, supported on the main frame 1; and vibrated in a manner to convey, longitudinally thereover, material thereon by means now to be described.

The pan 6 is formed from sheet metal to provide a planar pan bottom 7, and opposite vertical side walls 8—8. The pan is closed at its rear end, the left end as viewed, by an end wall 9; and the bottom is preferably stiffened by external transverse ribs 10—10 longitudinally spaced thereover and integrally mounted thereon.

The forward open end is stiffened by an integral angle iron structure 11 embracing the bottom and side walls.

The tops of the side walls 8—8 are bent outwardly as at 12—12 providing stiffening flanges.

Immediately under the top flanges 12—12 are steel strips 13—13 extending the full length of the side walls; integrally joined thereto; and four blocks 14—14 are integrally mounted on each strip at preferably equally spaced intervals longitudinally.

Diagonally under the blocks 14—14 and integrally mounted on each of the inner frame walls 4—4 are four blocks 15—15, and adjacent thereto, pieces of angle section steel 16—16.

The pan 6 is supported on the main frame by a plurality of supports 17—17 in the nature of links, hingingly connected at upper ends to the blocks 14—14 and hingingly connected at the lower ends to the blocks 15—15. Eight supports, four at each side of the pan have been indicated.

The upper hinging connections are not vertically above the lower connections but are disposed to the left thereof, so that lines through them are inclined to the vertical. When the pan 6 is vibrated longitudinally (as will be described) and moves to the right, it rises, and on the return vibration to the left, it falls. This is the well known material conveying movement of pans supported in this manner.

The actual construction of these supports 17—17 is preferably that disclosed in U.S. Patent 2,678,720, May 18, 1954, to which the reader is referred for more complete description. In said patent the corresponding supports 9—9 are inclined upwardly to the right and the pan in Fig. 2 of the patent conveys toward the left, whereas in the drawing hereof, Fig. 1, the supports 17 are inclined upwardly toward the left and the pan 6 conveys toward the right.

Herein, the supports 17—17 comprise the said blocks 14 and 15 and the angle pieces 16, and springs 18 and 19 as illustrated, and these parts correspond to the blocks 22 and 26 and the angle pieces 29, and the springs 35—34 of the patent; and it is believed that (in view of said patent) the structure and mode of operation of the supports 17 hereof need not be further described.

A steel structure is carried by and depends from the pan 6 to support a mechanical vibrator. It comprises transversely spaced parallel generally triangular hanger plates 21—21 integrally mounted on the outside of the pan side walls 8—8 and depending below the pan, and bridged by angle section pieces 22—22 integrally joined thereto. Upon the pieces 22—22 is mounted by integral junctures, a steel frame comprising a flat steel base 23 inclined out of the vertical and parallel to the inclined direction of the supports 17—17. Upon this base are bolted the feet 24—24 of the housing 25 of a vibrator.

This vibrator is of a well known type, an example of which is disclosed in U.S. Patent 2,097,347, October 26, 1937. Within the housing 25 is a vibrator of the rotary unbalanced weight type, driven by a belt pulley 26 on the outside of the housing, belted to a belt pulley 27 on a motor 28.

The vibrator produces rectilinear vibrations of the housing 25 and is arranged so that the direction of the vibrations is at right angles to the base 23 and therefore at right angles to the inclined direction of the supports 17—17.

It will be noted that the vibrations are transmitted from the vibrator directly to the pan, and are parallel with the directions of movement of the vibrating pan. This is one of the improvements hereof over prior conveyors, an example of the latter being that disclosed in aforesaid U.S. Patent 2,678,720, in which the vibrations produced by the vibrator are in the longitudinal direction of the pan, and only a component of the vibrations is effective to vibrate the pan, since the direction of the vibratory movement of the pan is at an angle to its longitudinal direction.

The motor 28 belted to the vibrator is mounted stationarily on the main frame, and in such position that a line through the centers of the two pulleys 26 and 27 is at right angles to the direction of the vibrations whereby the belt is not subjected to variable tension by the vibrating movement of the vibrator pulley 26.

This motor mounting comprises a steel bracket 29 integrally secured to and depending from the under flange of one of the side channels 2. The bracket may include a base 30 parallel to the vibrator base 23, upon which the motor is bolted whereby the motor may be adjustably moved to tighten the belt.

At 31 generally is another sheet metal pan, above and partly nested with the lower pan 6; comprising opposite side walls 32 of Z-form to provide longitudinal top flanges 33 and inwardly directed bottom flanges 34. A rear end wall 35 is joined to the side walls.

A rectangular steel bottom 38 provided with perforations for screening purposes, shown separately in Fig. 6, rests upon the bottom flanges 34 and is detachably secured thereon by bolts projected downwardly through the bottom and flanges and threaded into nut-like blocks 40—40.

The perforated bottom plate is separately made and is stiffened by a plurality such as four stiffening ribs 41—41 integrally secured to its under side.

By being detachable, the bottom plate 38 is interchangeable with other differently perforated plates; and to hold the side walls in position to facilitate this operation, a number of transverse angle section bars 42 are secured to and bridging the under sides of the bottom flanges 34.

A transverse angle section bar 43 may also be provided secured upon and bridging the top flanges 33—33.

Steel strips 44—44 are integrally mounted on the outside of the side walls 32—32 for a purpose to be described.

Extending laterally from each of the strips 13—13 of the lower pan is a pair of spring brackets comprising short angle section steel pieces 45—45, integrally secured to the strips, longitudinally spaced apart and with a leg of the angle section horizontal to constitute lower spring abutments 45—45; four in all, two for each strip 13.

Immediately above each of the four lower spring abutments 45 is a like upper horizontal spring abutment 47; which is a leg of an angle section piece extending laterally from and integrally mounted on the strip 44 of the upper pan; there being thus a total of four such spring abutments 47.

Between each pair of upper and lower spring abutments 47—45 is disposed a coil compression spring 49; and a clamp bolt 50 extends loosely downwardly through the abutments and axially through the spring with its head above the abutment 47 and a nut 52 below the abutment 45.

The described arrangement provides four springs 49; by which the upper pan 31 is supported on the lower pan 6; two springs on each side of the pans. The spring abutments 47—45 which determine the positions of the springs are preferably so located that the springs may all be alike and divide the weight of the upper pan equally among them, to which end the two springs on each side are equally distant longitudinally from the longitudinal midpoint of the pan.

The springs preferably have pre-load compression tension adjustable by the clamp bolt nut 52.

When in operation, the lower pan 6 is being vibrated as described, its vibratory movement is composed of horizontal and vertical components. The vertical components are transmitted through the springs 49 to the upper pan 31.

The horizontal components are also concurrently transmitted to the upper pan through a pair of horizontal rods or bars 53—53 one on each side of the upper pan, connected at their opposite ends to the upper and lower pans respectively as follows.

The bars 53 are preferably alike and each is preferably made from cut off lengths of flat, thin, wide spring steel strip.

Posts 54—54 comprising pieces of angle section steel are integrally mounted on the side strips 13—13 respectively of the lower pan. Each post extends upwardly and at its upper end has an angle section piece 55 integrally mounted thereon, one leg 56 of which is horizontal and constitutes an anchorage for one end of the bar 53; and to this end the bar 53 is rigidly clamped flatwise upon the angle leg 56 by a plate 57 and through bolts 58—58.

The post 54 is spaced longitudinally from the longitudinal mid point of the upper pan 31 and the bar 53 extends horizontally from the post at about the level of the center line of the strip 44 of the upper pan, and the other end of the bar 53 is connected to the upper pan at its mid point or at a point longitudinally midway between the aforesaid springs 49, as follows.

A pair of bolts 59—59 are projected horizontally through suitable holes in the side walls 32—32 of the upper pan and on through the strips 44—44.

A casting 60 is mounted on the bolt 59 by a rubber sleeve type of connection, of known construction, comprising an inner metal tube 61, an outer housing tube 62 formed in the casting 60, and a rubber sleeve 72 telescoped over the tube 61 and within the tube 62 and adhering to both.

The inner tube 61 is telescoped over the bolt 59 and rigidly clamped upon the strip 44 between a spacing washer 64 and a bolt nut 65.

The casting 60 has a flange 63 extending horizontally therefrom and the said other end of the bar 53 is clamped thereon between it and a clamp plate 66 by bolts 67.

The considerable transverse width of the bars 53—53 and of their connections to the respective pans will prevent the upper pan from shifting laterally or rocking on a vertical axis relative to the lower pan and will maintain it directly above the lower pan.

The bars 53—53 being horizontal will transmit horizontal components of movement directly from the lower pan to the upper pan; and having hinging action at both ends, they will not interfere with vertical components of movement of the upper pan relative to the lower pan.

The connections of the bars 53—53 to the lower pan have been shown as different from their connections to the upper pan, but if desired the connections to both pans may be alike.

In the foregoing where one part is described as integrally mounted on another part, this mounting is preferably made by welding.

In vibratory operation, the upward vertical component of movement of the lower pan raises the lower spring abutments 45—45 of the lower pan, toward the upper spring abutments 47 of the upper pan and this exerts upward force on the upper pan through the springs 49, which tends to raise the upper pan. The inertia of the upper pan and material on it will delay its upward movement and the lower abutments 45 will compress the springs. The lower abutments 45 will then be closer than normal to the upper abutments 47 and there will be clearance space between the nuts 52 and the lower abutments 45.

The springs 49 then overcome the inertia of the upper pan and expand and move the upper pan and its abutments 47 and the bolt 50 upwardly with quick recoil movement, which takes up the said clearance and abruptly stops upward movement of the upper pan, by engagement of the nuts 52 with the abutments 45.

Material pieces on the upper pan however are not abruptly stopped, but are free to go on moving upwardly, and do so, and then fall back again on to the pan. This agitates the pieces, and turns them over, and in general causes them to dance on the pan.

The return downward vertical component of movement of the lower pan moves the abutments 45 downwardly, and acting through the bolt 50, pulls the upper abutments 47 and the upper pan downwardly.

The inertia of the upper pan in this downward movement may cause it to overtravel and move the upper abutments 47 closer to the lower abutments 45 again compressing the springs 49 which again introduces said clearance above the nuts 52 and the springs may then recoil again and move the upper abutments 47 and upper pan upwardly and again stop the pan abruptly when the clearance is taken up and again agitate the pieces as will be understood.

This agitated dancing movement of the pieces reorients them in the respects hereinbefore referred to.

If the tension of springs 49 are adjusted to be too great, the upper pan may vibrate vertically in unison with the lower pan and not agitate the pieces enough for the intended purpose; and if adjusted to be too small, the violence of the spring recoil may throw the pieces upwardly so far as to interfere with or prevent conveying movement thereof.

The springs are therefore adjusted to an optimum degree of tension.

The advantages of the invention appear when, as an illustrative example, the material supplied to the upper pan is that coming from a punch press making metal washers; and reference may be had to Figs. 12 to 15.

As is well known, such material is a mixture of perfect washers as indicated at 68, slugs punched out to make the center hole, as indicated at 69, and a quantity of washers that are imperfect because of not being completely circular as indicated at 70.

In Figs. 12 and 13 each of these kinds of pieces are shown as they are conveyed along the upper pan bottom and come over circular perforations indicated at 71—71 in the pan bottom.

It is desired to have the slugs 69 and imperfect washers 70 fall through the perforations to the lower pan, and the perfect washers 68 to be conveyed over the upper pan.

The perforations 71 are made a little smaller than the diameter of the perfect washers 68. As shown in Figs. 12 and 13, the perfect washers 68 cannot fall through, the slugs 69 readily fall through, and the imperfect washers 70 cannot fall through, but if the imperfect washers are agitated as described they will sooner or later stand edgewise on the pan bottom and become oriented to the perforations so as to fall through as shown in Figs. 14 and 15.

The bottom of the upper pan being removable and replaceable, a number of pan bottoms may be supplied with the conveyor having perforations of different sizes and shapes and at different spacing, to adapt them to different washers or other pieces of different sizes and shapes.

In the preferred construction and mode of operation; the vibratory movement of each of the pans, may be described as comprising a forward and backward longitudinal component of movement in the direction of the pan bottom and an upward and downward angular component at an angle thereto, preferably a right angle, which causes material on the pan bottoms to be conveyed thereover; the longitudinal components of the two pans being equal and occurring in unison; and the angular component of the upper pan being equal to that of the lower pan but not occurring in unison with it, being out of phase with it and being abruptly stopped in the upward direction.

I claim:

1. A vibratory screening and conveying apparatus comprising a stationary main frame; a pair of elongated conveyor pans one above the other and generally horizontal in positions of use and each of generally trough form comprising a trough bottom; perforations in the bottom of the upper pan; the lower pan supported on the frame by supporting means that constrains it to have conveying movement in horizontal and vertical directions concurrently when vibrated; means for vibratingly moving the lower pan; spring means supporting the upper pan upon the lower pan and communicating vertical movement of the lower pan to the upper pan; and generally horizontal link means connecting the lower pan to the upper pan and communicating horizontal movement to the upper pan.

2. In a screening and conveying apparatus, elongated lower and upper conveyor pans, disposed to be generally horizontal when in positions of use and each comprising a pan bottom; perforations in the bottom of the upper pan; means supporting the lower pan for vibratory bodily movement concurrently horizontally and vertically; means for vibrating the lower pan; spring means supporting the upper pan on the lower pan and communicating vertical movements of the lower pan to it, link means connecting the lower pan and upper pan to communicate horizontal movements of the lower pan to the upper pan; and stop means abruptly stopping vertical movement of the upper pan in the upward direction.

3. A vibratory screening and conveying apparatus comprising a stationary frame; a pair of elongated conveyor pans one above the other and generally horizontal in positions of use and each comprising a pan bottom; perforations in the bottom of the upper pan; the lower pan supported on the frame by supporting means that constrains it to have vibratory movement concurrently horizontally and vertically; means for vibratingly moving the lower pan; spring means supporting the upper pan on the lower pan and transmitting vertical movements of the lower pan to the upper pan; elongated horizontally rigid link means connected at its ends to the two pans and transmitting horizontal movements of the lower pan to the upper pan.

4. The apparatus described in claim 3 and in which the connection of the ends of the link means to the pans is a hinging connection.

5. In a two-deck vibratory screening and conveying apparatus, elongated lower and upper conveyor pans, each pan having a bottom horizontal in a position of use and two spaced apart upright side walls; the bottom of the upper pan provided with perforations therein; the upper pan nested downwardly within the lower pan disposing the pan bottoms spaced apart, and disposing the side walls of one pan transversely adjacent to the respective walls of the other; a pair of longitudinally spaced upper brackets on each of the side walls of the upper pan and a pair of longitudinally spaced lower brackets on each of the side walls of the lower pan; each upper bracket being in vertical alignment with a lower bracket; compression springs disposed between the vertically aligned brackets; another bracket on each of the side walls of one pan, each said other bracket aligned horizontally with a bracket on the side wall of the other pan; providing two pairs of horizontally aligned other brackets; a pair of elongated horizontal longitudinally and laterally rigid, vertically flexible links each connected at its opposite ends to the brackets of the respective horizontally aligned pairs.

6. The apparatus described in claim 5 and in which adjustable devices connect the vertically aligned brackets, constructed to adjustably draw the vertically aligned brackets toward each other to put adjustable compression in the springs disposed between the brackets.

7. A vibratory screening and conveying apparatus comprising a stationary frame; a pair of elongated conveyor pans one above the other and generally horizontal in a position of use and each comprising a bottom; perforations in the bottom of the upper pan; the lower pan supported on the frame by supporting means that constrains it to have bodily conveying vibratory movement in horizontal and vertical directions concurrently; means for vibrating the lower pan; means connecting the pans to transmit horizontal movements of the lower pan to the upper pan; spring means between the pans, supporting the upper pan on the lower pan and transmitting vertical movements of the lower pan therethrough to the upper pan; adjustable means to put adjustable pre-load tension in the spring means comprising stop means to retain the pre-load tension in the spring means; the spring means arranged to be additionally tensioned upon initiation of transmission of vertical movement therethrough and to thereafter discharge the additional tension and transmit vertical movement to the upper pan thereby; and the stop means arranged to abruptly stop spring-discharge-effected vertical movement of the upper pan.

8. A vibratory screening and conveying apparatus comprising a stationary frame; a pair of elongated conveyor pans one above the other and generally horizontal in a position of use and each comprising a bottom; perforations in the bottom of the upper pan; the lower pan supported on the frame by supporting means that constrains it to have bodily conveying vibratory movement in horizontal and vertical directions concurrently; means for vibrating the lower pan; means connecting the pans to transmit horizontal movements of the lower pan to the upper pan; compression coil springs between the pans, supporting the upper pan on the lower pan and transmitting vertical movements of the lower pan therethrough to the upper pan; adjustable means to put adjustable pre-load compression in the springs comprising stop means to retain the pre-load tension in the springs; the springs arranged to be additionally tensioned upon initiation of transmission of vertical movement therethrough and to thereafter discharge the additional tension and transmit vertical movement to the upper pan thereby; and the stop means arranged to abruptly stop spring-discharge-effected vertical movement of the upper pan.

9. A vibratory screening and conveying apparatus comprising a stationary frame; a pair of elongated conveyor pans one above the other and generally horizontal in a position of use and each comprising a bottom; perforations in the bottom of the upper pan; the lower pan supported on the frame by supporting means that constrains it to have conveying vibratory movement in horizontal and vertical directions concurrently; means for vibrating the lower pan; means connecting the pans to transmit horizontal movements of the lower pan to the upper pan; means supporting the upper pan for upward and downward vertical movements concurrently with its horizontal movements transmitted to it from the lower pan; means transmitting vertical movements of the lower pan to the upper pan; and stop means abruptly stopping vertical movements of the upper pan in the upward direction.

References Cited in the file of this patent

UNITED STATES PATENTS

| | | |
|---|---|---|
| 800,693 | Traylor | Oct. 3, 1905 |
| 1,397,338 | Sturtevant | Nov. 15, 1921 |
| 1,986,102 | Cole | Jan. 1, 1935 |
| 2,312,477 | Pollitz | Mar. 2, 1943 |
| 2,316,725 | Symons | Apr. 13, 1943 |
| 2,684,754 | Bankauf et al. | July 27, 1954 |
| 2,699,869 | Gear et al. | Jan. 18, 1955 |